No. 881,248. PATENTED MAR. 10, 1908.
H. LE BLON.
CHANGE SPEED GEARING.
APPLICATION FILED JAN. 31, 1907.

2 SHEETS—SHEET 2.

Witnesses:
D. Waldman
C. Heymann

Inventor
Hubert Le Blon.
by P. Singer
Attorney

UNITED STATES PATENT OFFICE.

HUBERT LE BLON, OF PARIS, FRANCE.

CHANGE-SPEED GEARING.

No. 881,248.  Specification of Letters Patent.  Patented March 10, 1908.

Application filed January 31, 1907. Serial No. 255,044.

*To all whom it may concern:*

Be it known that I, HUBERT LE BLON, a citizen of the French Republic, and resident of Paris, France, have invented certain new and useful Improvements in and Relating to Change-Speed Gearings, of which the following is a specification.

This invention relates to improvements in change speed transmission mechanism for motor vehicles and other purposes.

The object of the invention is to provide a device of this character affording means whereby parts may be adjusted to obtain a plurality of different speeds of a driven member or part from a driving member rotated at a constant speed and to further reverse the speed of the driven member, the different adjustments for changing speed and for reversing being effected by a single operating or controlling member.

In the preferred embodiment of the invention gear wheels are employed and the invention provides means whereby the driven member may be operated at two relatively high speeds and at two relatively low speeds.

The invention will be more fully described in connection with the accompanying drawings and will be more particularly pointed out and ascertained in and by the appended claims.

Figure 1:
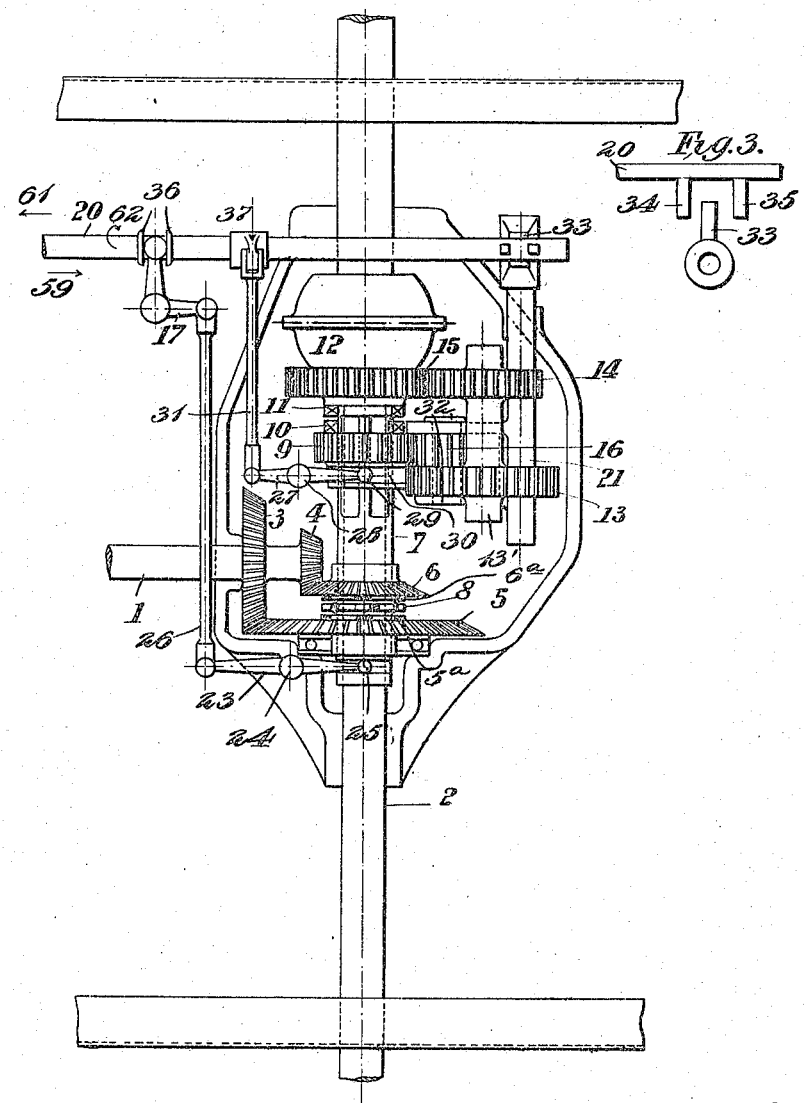
Figure 2:
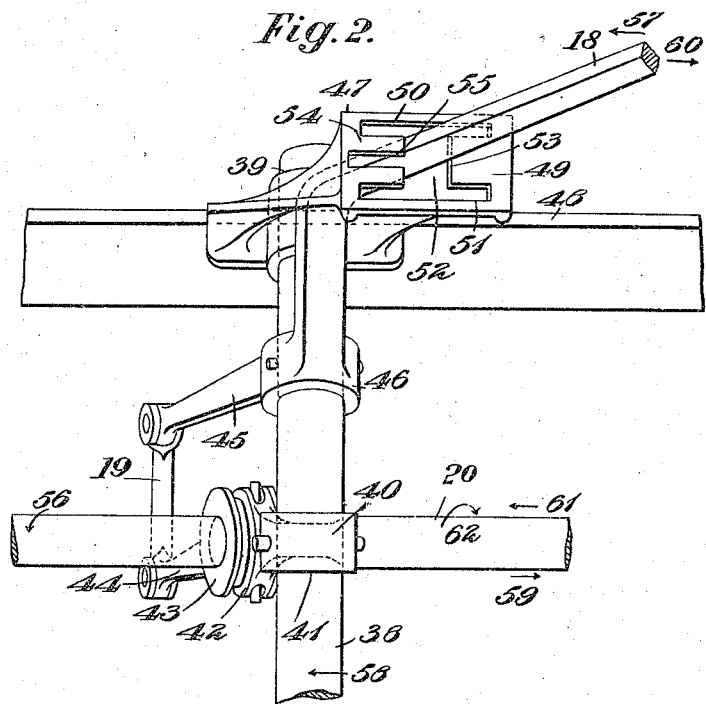

In the drawings: Figure 1 is a plan view of a device embodying the main features of my invention shown as applied to the rear axle of the vehicle. Fig. 2 is a perspective view of the controlling device. Fig. 3 is a detail view of a portion of the invention hereinafter described.

Like characters of reference designate similar parts throughout the drawings.

The invention will now be described in connection with the one specific embodiment shown but it will be understood that the invention is not to be limited to such specific disclosure except for such limitations as the appended claims import.

The driving member which is in the form of a shaft is designated by 1 and the driven member which is in the form of an axle is designated by 2. The driving member 1 is operatively connected with the driven member 2 by a primary change speed device which as shown consists of bevel gears 3 and 4 rigidly mounted on the driving shaft 1 and gears 5 and 6 non-slidably and loosely or rotatably mounted on a sleeve 7 which latter is slidably and non-rotatively mounted on the driven member or axle 2.

The gear wheels 5 and 6 are provided with clutch members 5ª and 6ª adapted to be engaged by an intermediate clutch member 8 rigidly mounted on sleeve 7 whereby either of the wheels 5 or 6 may be rigidly connected with said sleeve. Means in the form of a primary clutch actuating device are provided for effecting such clutch engagement and as shown such means comprise a lever 23 pivotally mounted at 24 to any suitable stationary part and engaging at its inner end 25 the sleeve 7, the other end of said lever 23 being connected with a link 26 operated through a bell crank 17 from the controlling device in a manner to be hereinafter more fully described. Said axle 2 carries a differential gearing inclosed in the casing 12 which gearing is connected with the axle 2 and a gear 15, the latter being loosely mounted on the axle 2 and having a clutch member 11. The gear 15 will for convenience be referred to as a load carrying element or as a load gear or element inasmuch as the load is carried by means of this gear. The axle 2 through the differential gearing is adapted for direct engagement with the primary change speed device as shown by means of a clutch member 10 adapted to be thrown into engagement with the clutch member 11, said clutch member 10 being slidably and not rotatively mounted on sleeve 7. Said axle 2 is also adapted to be driven through the differential gearing and from the primary change speed device through an intermediate or secondary change speed device which will now be described in detail.

A pinion 9 slidably and non-rotatively mounted upon sleeve 7 is adapted to be thrown into and out of mesh engagement with a pinion 13 mounted on shaft 13' which latter may be conveniently supported in any suitable form of bearings. A pinion 14 also mounted on shaft 13' meshes with pinion 15 and the pinions 13 and 14 are immovable longitudinally on the shaft 13' and are maintained in the fixed relation shown. For convenience in construction the coupling or clutch member 10 is rigidly secured to the pinion 9 and is movable therewith by means of a secondary operating device in the form of a lever 27 pivoted at 28 and engaging at 29 a hub portion 30 formed on the pinion 9, said lever 27 being connected by a link 31 to the main operating device which will be hereinafter more fully described.

In addition to the primary and secondary change speed devices there is provided a reversing device which preferably performs its function in connection with the secondary change speed device. As shown said reversing device comprises a rock shaft 21 mounted in suitable bearings and provided with bracket arms 32 carrying a reversing gear 16. Said reversing gear 16 is so proportioned and disposed with respect to the gears 9 and 13 as to be capable of being thrown in mesh with said gears when the latter are in a non-meshing relation with each other. To this end the gear 16 slightly exceeds in width the combined width of the gears 9 and 13 and is normally held in such position that it can be thrown into mesh engagement with both of the gears 9 and 13 when the latter are in the position shown in Fig. 1. On the outer end of shaft 21 there is mounted an arm 33 which projects into the path of extensions or studs 34 and 35 mounted upon a shaft 20 forming a part of the main operating device which will now be described in detail.

The bell crank 17 forming a part of the primary clutch actuating device is connected with a speed change operating shaft 20 by having its end interposed between two annular shoulders 36, and the link 31 of the secondary speed actuating device is connected with an arm 37 mounted on shaft 20. Said shaft 20 may be mounted in any suitable form of bearings affording said shaft a free oscillatory and longitudinal movement. The means for effecting such oscillatory longitudinal movement of the shaft 20 consists of the following parts.

38 designates a controller shaft mounted at one end in a suitable bearing 39 and provided with a shifting member 40 non-rotatively and non-slidably mounted thereon. Said shifting member comprises a hub portion 41 and a bifurcated extension 42 connected with a part 43 of an oscillatory device. Said oscillatory device consists as shown of the part or collar 43 which is mounted on shaft 20 and provided with an arm 44 connected by a link 19 with an arm 45 whose hub 46 is mounted on shaft 38. A controlling member in the form of a lever 18 is preferably rigidly secured by being formed integral with the hub 46 which latter is slidably and non-rotatively mounted on the shaft 38. A segment guide 47 for the controlling lever 18 is mounted upon any suitable stationary part such for instance as 48 and is provided with a plurality of slots in its upper face 49 for limiting movement of the lever 18. At extreme lateral points slots 50 and 51 are provided each of which permit an extreme longitudinal swing of the lever 18. In order to afford lateral movement of the lever the slots 50 and 51 are connected by a transverse opening 52. The rear portion of the upper face along said transverse opening presents a continuous margin 53 while the forward portion 54 is provided with a slot 55.

The operation is as follows: The parts in Figs. 1 and 2 occupy adjusted positions wherein the intermediate clutch 8 is out of coupling relation with clutch portions 5ª and 6ª in which position the wheels 5 and 6 run freely on the sleeve 7 and permit operation of the driving shaft 1 without operating the axle 2. Assuming that the operator desires a relatively high speed from the primary change speed device and a direct drive with the gear 15 he will first move the lever 18 laterally into the slot 50 which movement will through arm 45 link 19 and arm 44 rotate the shaft 20 in the direction of arrow 56 thereby acting through arm 37 link 31 and lever 27 to throw the clutch members 10 and 11 into coupling relation effecting direct drive connection between sleeve 7 and the gear 15. The operator will next swing the lever 18 in the direction of the arrow 57 thereby turning shaft 38 in the direction of arrow 58 and shifting shaft 20 in the direction of the arrow 59 and serving through the connections hereinbefore described to throw the member 8 into coupling relation with the clutch 6ª. This adjustment gives a direct drive from gears 4, 6 and clutch members 10 and 11. Assuming now that the operator desires to change speed to a relatively slower rate he will swing the lever 18 in the slot 50 in the direction of the arrow 60 which will serve to shift the shaft 20 in the direction of the arrow 61 without oscillating the same and will serve to disengage the clutch member 8 from member 6ª and throw it into engagement with member 5ª thereby adjusting the parts to drive through gears 3 and 5 direct through clutch 10 and 11. Assuming now that the operator wishes to drive through the secondary change speed device he will move the lever 18 into slot 51 which will cause a rotation or oscillation of the shaft 20 in the direction of arrow 62 and will serve to throw the clutch 10 out of engagement with the clutch 11 and throw wheel 9 into mesh with wheel 13 thereby driving from sleeve 7 through gears 9, 13, 14 and 12. It will be understood that when the lever 18 is in an intermediate position the clutch member 8 will also be in an intermediate position therefore the lateral movement of the lever 18 from slot 50 to slot 51 merely serves to change the relation or position of gear 9 and clutch 10, the speed being changed only by a longitudinal swing of the lever 18. In the first adjustments described relatively high and low speeds were set through direct connection with the gear 15 but in the adjustments now about to be described the two relatively high and low speeds will each be reduced by the secondary change speed device as will be obvious from the proportions of the gearing thereof. With the pinion 9 in mesh with the pinion 13 and the lever 18 in slot 51 the operator can adjust the clutch member 8 into coupling relation with either of the members 5ª or 6ª by swinging the lever 18 in the slot 51 in the manner hereinbefore described.

Assuming that the operator desires to reverse the vehicle and drive the same backwardly he will first move the lever 18 into an intermediate position in the passageway 52 so that the lever 18 is in register with the slot 55. In this adjustment the pinion 9 will be in the position shown in Fig. 1 and the member 8 will be out of coupling relation with clutches 5ª and 6ª. It will be noted that the pinions 9 and 13 are now out of operative relation so that they can rotate in opposite directions. By throwing the lever 18 in the direction of arrow 57 into the slot 55 the shaft 20 will be shifted in the direction of arrow 59 and the member 8 will be thrown into coupling relation with the member 6ª. It will be noted that slot 55 is somewhat longer than slots 50 and 51 therefore when the lever 18 is swung to the limit of its movement the stud 34 will engage arm 33 and swing the pinion 16 upwardly into mesh with pinions 9 and 13 thereby reversing the direction of rotation of pinion 13 from its direction of rotation when in mesh with pinion 9 and thereby serving to reverse the direction of rotation of the axle 2. When the lever 18 is swung rearwardly out of slot 55 into passage way 52 the weight of pinion 16 will be sufficient to automatically throw it out of mesh with pinions 9 and 13 by gravity.

By reference to Fig. 3 it will be noted that ample play is provided between studs 34 and 35 to permit a sufficient shift of the shaft 20 to effect ordinary change speed adjustments without throwing in the reversing gear, the slots 50 and 51 being so proportioned as to prevent sufficient movement of the lever 18 to throw the gear 16 into a mesh position. However the slot 55 permits sufficient extra movement to effect engagement of the stud 34 and arm 33 to throw in the reversing gear. If for any reason the gear 16 should fail to drop out of a mesh engagement the stud 35 will engage the arm 33 when the lever 18 assumes the position shown in Fig. 2 to positively throw said gear 16 out of mesh relation with the gears 9 and 10.

I claim:—

1. In combination, a driving member, high and low speed gears therefor, a driven member, a sleeve therefor loosely mounted high and low speed gears for said sleeve meshing with said first mentioned gears and provided with adjacent coupling members, an intermediate coupling member mounted on said sleeve, and means for shifting said sleeve to throw said intermediate coupling member into engagement with either of said loosely mounted gears.

2. In combination, a driving member, high and low speed gears for said member, a driven member, a sleeve for said driven member, high and low speed gears for said sleeve meshing with said first mentioned gears, means for throwing the sleeve gears into engagement with said sleeve, a load gear for said driven member, a shiftable clutch, and means engaging said clutch to operatively connect said sleeve and load gear.

3. In combination, a driving member, a driven member, an intermediate member, a primary change speed device for said driving and intermediate members, a secondary change speed device for said intermediate and driven members, means whereby direct connection may be effected between said intermediate and driven members, and a single controlling device whereby said primary and secondary change speed devices and said means may be independently adjusted.

4. In combination, a driving member, high and low speed elements therefor, an intermediate member, high and low speed elements therefor coöperating with said first mentioned elements, a clutch for throwing selected elements into engagement with said intermediate member, a driven member, a clutch for effecting direct connection between said intermediate and driven members, and a change speed device for said intermediate and driven members.

5. In combination, a driving member, a driven member, an intermediate member, a change speed device for said driving and intermediate members, and a change speed device for said intermediate and driven members, said last named change speed device being adapted to effect direct connection between said intermediate and driven members.

6. In combination, a driving shaft, high and low speed elements, a driven shaft, a load element, a sleeve for said driven shaft, high and low speed elements for said sleeve in driving engagement with said first mentioned elements, means for severally throwing said sleeve elements into driving engagement with said sleeve, clutch members for said sleeve and load element, and means for throwing said clutch members into driving engagement.

7. In combination, a driving shaft, high and low speed elements for said shaft, a driven shaft, a load element for said driven shaft, a sleeve for said driven shaft, high and low speed elements for said driven shaft in driving engagement with said first mentioned elements, a coupling device for effecting drive connection between the load element and said sleeve, and a single controlling device for throwing said sleeve element into engagement with said sleeve and for operating said coupling device to effect driving connection between said sleeve and load element.

8. In combination, a driving and a driven shaft, a primary change speed device for said shafts, a load element for said driven shaft, a secondary change speed device for said driven shaft, controlling means for said primary change speed device, controlling means for said secondary change speed device, and a controller whereby either of said change speed devices may be independently operated.

9. In combination, a driving and a driven shaft, a primary change speed device for said shafts, a load element for said driven shaft, a secondary change speed device for said driven shaft, and a single controller whereby either of said devices may be independently operated.

10. In combination, a driving and a driven shaft, a primary change speed device for said driving shaft, a load element for said driven shaft, a secondary change speed device for said driven shaft and a speed reversing device, and a single controlling device for said primary secondary and speed reversing devices.

11. In combination, a driving and a driven shaft, a primary change speed device for said driving shaft, a load element for said driven shaft, a secondary change speed device for said driven shaft, a speed reversing device associated with said secondary device, and a single controlling means for said primary secondary and reversing devices.

12. In combination, a driving and a driven shaft, a plurality of change speed devices for transmitting power from said driving to said driven shaft, and a single controlling means whereby any one of said devices may be independently operated.

13. In combination, a driving and a driven shaft, a plurality of change speed devices for transmitting power from said driving to said driven shaft, a speed reversing device associated with one of said change speed devices, and a single controlling means for said change speed and reversing devices.

14. In combination, a driving and a driven shaft, a plurality of change speed devices for transmitting power from said driving to said driven shaft, a speed reversing device, and a single controlling means for said change speed and reversing devices.

15. In combination, a change speed mechanism comprising two change speed devices, a controlling lever, a controlling shaft actuated thereby, a movably mounted change speed operating shaft for operating said devices, and a combined shifting member and oscillating device associated with said controlling, operating shaft and lever.

16. In combination, a change speed mechanism comprising two change speed devices, a movably mounted change speed operating shaft for said devices adapted to be shifted or oscillated to control the same, a controlling shaft, a combined shifting member and oscillating device associated with said controlling and operating shafts, and a controlling lever for operating said shafts.

17. In combination, a change speed mechanism comprising two change speed devices, a movably mounted change speed operating shaft for said devices adapted to be shifted or oscillated to control the same, a controlling shaft adapted to be shifted or oscillated, a combined shifting member and oscillating device associated with said controlling and operating shafts, and a controlling lever associated with said controlling shaft and oscillating device and operable in two planes for operating said shafts.

18. In combination, a change speed mechanism comprising two change speed devices, a movably mounted change speed operating shaft for said devices adapted to be shifted or oscillated to control the same, a controlling shaft adapted to be shifted or oscillated, mechanism connecting said shafts whereby oscillation of the controlling shaft serves to shift the operating shaft and whereby shifting of the controlling shaft serves to oscillate the operating shaft, and means for operating said controlling shaft for the purpose set forth.

19. In combination, a change speed mechanism comprising change speed devices, a change speed operating shaft for said devices adapted to be shifted or oscillated to control the same, a controlling shaft adapted to be shifted or oscillated, mechanism connecting said shafts whereby either movement of one shaft causes a different movement of the other shaft, and means for effecting movement of said shafts.

20. In combination, a change speed mechanism comprising change speed devices, a change speed operating shaft for said devices adapted to be shifted or oscillated to control the same, a controlling shaft adapted to be shifted or oscillated, mechanism connecting said shafts for transmitting reverse movements from one to the other, and means for effecting movement of said shafts.

21. In combination, a change speed mechanism comprising change speed devices, a change speed operating shaft for said devices adapted to be shifted or oscillated to control the same, a controlling shaft adapted to be shifted or oscillated, and mechanism connecting said shafts for transmitting reverse movements from one to the other.

22. In combination, a change speed mechanism comprising change speed devices, a change speed operating shaft for said devices adapted to be operated in different directions, a controlling shaft adapted to be operated in different directions, and mechanism connecting said shafts for transmitting reverse movements from one to the other.

23. In combination, a change speed mechanism comprising change speed devices, a change speed operating shaft for said devices adapted to be shifted or oscillated to control the same, a controlling shaft adapted to be shifted or oscillated, mechanism connecting said shafts for transmitting reverse movements from one to the other, a controlling lever connected with said controlling shaft and mechanism, and a quadrant guide for said controlling lever provided with guide slots for oscillating said controlling shaft, said guide slots being connected and permitting shifting movement of said lever to shift said controlling shaft.

In testimony whereof I have hereunto set my hand in presence of two witnesses.

HUBERT LE BLON

Witnesses:
ADOLPHE STURM,
H. C. COXE.